US007373528B2

(12) United States Patent
Schindler

(10) Patent No.: US 7,373,528 B2
(45) Date of Patent: May 13, 2008

(54) INCREASED POWER FOR POWER OVER ETHERNET APPLICATIONS

(75) Inventor: Frederick R. Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 353 days.

(21) Appl. No.: 10/998,077

(22) Filed: Nov. 24, 2004

(65) Prior Publication Data

US 2006/0112288 A1    May 25, 2006

(51) Int. Cl.
    *G06F 1/26* (2006.01)
(52) U.S. Cl. ........................ 713/300; 713/320
(58) Field of Classification Search ........... 713/300, 713/320, 330
    See application file for complete search history.

(56) References Cited

U.S. PATENT DOCUMENTS

| 4,131,767 | A | 12/1978 | Weinstein ............... 179/170.2 |
| 4,161,719 | A | 7/1979 | Parikh et al. ........... 340/147 SY |
| 4,232,199 | A | 11/1980 | Boatwright et al. ........ 179/18 B |
| 4,397,020 | A | 8/1983 | Howson ................. 370/105 |
| 4,532,626 | A | 7/1985 | Flores et al. ............. 370/85 |
| 4,599,494 | A | 7/1986 | Welty .................. 179/84 T |
| 4,626,954 | A | 12/1986 | Damiano et al. ........... 361/96 |
| 4,710,949 | A | 12/1987 | Ahuja .................. 379/26 |
| 4,723,267 | A | 2/1988 | Jones et al. .............. 379/93 |
| 4,875,223 | A | 10/1989 | Curtis .................. 375/36 |
| 4,899,204 | A * | 2/1990 | Rosen et al. ............. 250/551 |
| 4,922,160 | A * | 5/1990 | Ogawa .................. 318/135 |
| 4,969,179 | A | 11/1990 | Kanare et al. ............ 379/33 |
| 5,029,201 | A | 7/1991 | Bindels ................. 379/98 |
| 5,034,948 | A | 7/1991 | Mizutani et al. ........... 379/79 |
| 5,056,131 | A | 10/1991 | Kanare et al. ............ 379/33 |
| RE33,900 | E | 4/1992 | Howson ................. 370/105 |
| 5,199,049 | A | 3/1993 | Wilson ................. 375/104 |
| 5,223,806 | A | 6/1993 | Curtis et al. ............. 333/12 |
| 5,311,518 | A | 5/1994 | Takato et al. ........... 370/110.1 |
| 5,321,372 | A | 6/1994 | Smith ................... 333/1 |
| 5,406,260 | A | 4/1995 | Cummings et al. ......... 340/568 |
| 5,541,957 | A | 7/1996 | Lau ................... 375/258 |
| 5,574,748 | A | 11/1996 | Vander Mey et al. ....... 375/204 |

(Continued)

FOREIGN PATENT DOCUMENTS

WO    WO 99/53408    10/1999

OTHER PUBLICATIONS

James Garrett, "Making the Most Out of 802.3af", Dec. 30, 2003, D&R Industry Articles, http://www.us.design-reuse.com/articles/article6889.html.*

(Continued)

*Primary Examiner*—Chun Cao
(74) *Attorney, Agent, or Firm*—Baker Botts L.L.P.

(57) ABSTRACT

According to one embodiment of the invention, a method for supplying power over Ethernet includes determining whether a first port of power sourcing equipment is supplying current to a power over Ethernet device in a predetermined current range. The method also includes logically connecting a second port of the power sourcing equipment to the power over Ethernet device in response to determining that a first port of the power sourcing equipment is supplying current to the power over Ethernet device. The method also includes supplying power from the second port to the power over Ethernet device.

31 Claims, 5 Drawing Sheets

U.S. PATENT DOCUMENTS

| | | | | |
|---|---|---|---|---|
| 5,655,077 | A | 8/1997 | Jones et al. | 395/187.01 |
| 5,659,542 | A | 8/1997 | Bell et al. | 370/496 |
| 5,671,354 | A | 9/1997 | Ito et al. | 395/187.01 |
| 5,684,950 | A | 11/1997 | Dare et al. | 395/187.01 |
| 5,796,185 | A | 8/1998 | Takata et al. | 307/140 |
| 5,799,040 | A | 8/1998 | Lau | 375/258 |
| 5,802,042 | A | 9/1998 | Natarajan et al. | 370/255 |
| 5,815,665 | A | 9/1998 | Teper et al. | 395/200.59 |
| 5,918,016 | A | 6/1999 | Brewer et al. | 395/200.5 |
| 5,944,824 | A | 8/1999 | He | 713/201 |
| 5,947,773 | A | 9/1999 | Karam | 439/676 |
| 5,994,998 | A | 11/1999 | Fisher et al. | 340/310.01 |
| 6,011,910 | A | 1/2000 | Chau et al. | 395/200.59 |
| 6,021,496 | A | 2/2000 | Dutcher et al. | 713/202 |
| 6,047,376 | A | 4/2000 | Hosoe | 713/201 |
| 6,092,196 | A | 7/2000 | Reiche | 713/200 |
| 6,115,468 | A | 9/2000 | De Nicolo | 379/413 |
| 6,134,666 | A | 10/2000 | De Nicolo | 713/300 |
| 6,140,911 | A | 10/2000 | Fisher et al. | 340/310.01 |
| 6,218,930 | B1 | 4/2001 | Katzenberg et al. | 340/310.01 |
| 6,253,330 | B1* | 6/2001 | Denkin et al. | 713/300 |
| 6,283,789 | B1* | 9/2001 | Tsai | 439/502 |
| 6,295,356 | B1 | 9/2001 | De Nicolo | 379/413 |
| 6,308,240 | B1 | 10/2001 | De Nicolo | 710/300 |
| 6,310,781 | B1 | 10/2001 | Karam | 361/764 |
| 6,347,949 | B1 | 2/2002 | Edwards et al. | 439/170 |
| 6,472,884 | B1* | 10/2002 | Brockhaus | 324/539 |
| 6,526,515 | B1* | 2/2003 | Charles et al. | 713/300 |
| 6,535,983 | B1* | 3/2003 | McCormack et al. | 713/310 |
| 6,539,484 | B1* | 3/2003 | Cruz | 713/300 |
| 6,541,878 | B1 | 4/2003 | Diab | 307/17 |
| 6,643,566 | B1* | 11/2003 | Lehr et al. | 700/286 |
| 6,762,675 | B1 | 7/2004 | Cafiero et al. | 340/10.42 |
| 6,804,351 | B1 | 10/2004 | Karam | 379/413 |
| 6,894,405 | B2* | 5/2005 | Yuan | 307/45 |
| 7,040,926 | B2* | 5/2006 | Ferentz | 439/676 |
| 2001/0040486 | A1* | 11/2001 | Kpodzo et al. | 333/124 |
| 2002/0063584 | A1 | 5/2002 | Molenda et al. | 327/67 |
| 2004/0156496 | A1 | 8/2004 | Karam | 379/413 |
| 2004/0218324 | A1* | 11/2004 | Ferentz | 361/90 |
| 2005/0080516 | A1* | 4/2005 | Pincu et al. | 700/297 |
| 2005/0085212 | A1* | 4/2005 | Peker et al. | 455/402 |

OTHER PUBLICATIONS

Kiss, Peter (candidate), "Chapter 3, Cascaded Delta-Sigma ADCs", Thesis; "Politehnica" University of Timisoara; cover page plus pp. 45-71, Aug. 20, 1999 revised: Dec. 31, 1999.

Daniel Dove, Powerpoint Presentation, "Power over the DTE", Jan. 2000.

Robert Muir, Powerpoint Presentation: "Update on Diode Discovery Process", May 2000.

"Data Terminal Equipment (DTE) Power via Media Dependent Interface (MDI)", IEEE P802.3af/D3.01 (Revision of IEEE Std. 802.3-2000), May 2002.

"33. Data Terminal Equipment (DTE) Power via Media Dependent Interface (MDI)", Draft Supplement to IEEE Standard 802.3 (IEEE Draft P802.3af/D3.2), Sep. 5, 2002.

"Amendment: Data Terminal Equipment (DTE) Power via Media Dependent Interface (MDI)", IEEE Draft P802.3af/D4.3, (IEEE Standards Department, Draft Amendment 802-3-2002), Apr. 2003.

Hugh Barrass, "Multi-Pair Aggregate Power Distribution"—U.S. Appl. No. 10/287,886, pp. 1-25, Nov. 4, 2002.

Jeffrey D. Provost, "Inline Power Control"—U.S. Appl. No. 10/618,211, pp. 1-15, Jul. 11, 2003.

Daniel C. Biederman, "Inline Power Based Device Communications"—U.S. Appl. No. 10/651,596, pp. 1-27, Aug. 29, 2003.

Cafiero, et al. "Method and Apparatus for Remote Powering of Device Connected to Network"—U.S. Appl. No. 10/836,923, pp. 1-16, Apr. 29, 2004.

Roger A. Karam, "Method and Apparatus for Detecting a Compatible Phantom Powered Device Using Common Mode Signaling"—U.S. Appl. No. 10/855,212, pp. 1-29, May 26, 2004.

IEEE Draft P802.3af/D3.0; IEEE Computer Society, The Institute of Electrical and Electronics Engineers, Inc., 2001.

IEEE Draft P802.3af/D3.01; IEEE Computer Society, The Institute of Electrical and Electronics Engineers, Inc., 2001.

IEEE Draft P802.3af/D3.1; IEEE Computer Society, The Institute of Electrical and Electronics Engineers, Inc., 2002.

IEEE Draft P802.3af/D3.2; IEEE Computer Society, The Institute of Electrical and Electronics Engineers, Inc., 2002.

IEEE Draft P802.3af/D4.0; IEEE Computer Society, The Institute of Electrical and Electronics Engineers, Inc., 2002.

"*IEEE Standards*"; 802.3af™; IEEE Computer Society, The Institute of Electrical and Electronics Engineers, Inc., Jun. 18, 2003.

IEEE Draft P802.3af/D4.01; IEEE Computer Society, The Institute of Electrical and Electronics Engineers, Inc., 2003.

* cited by examiner

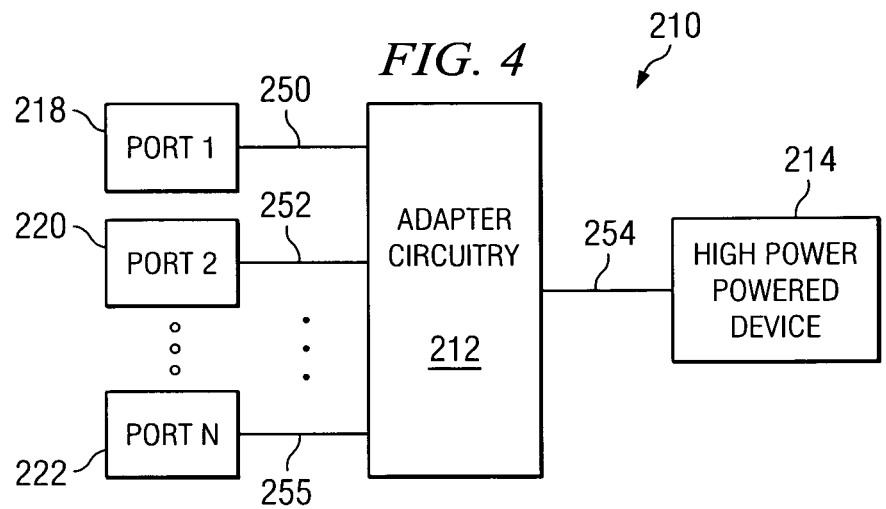
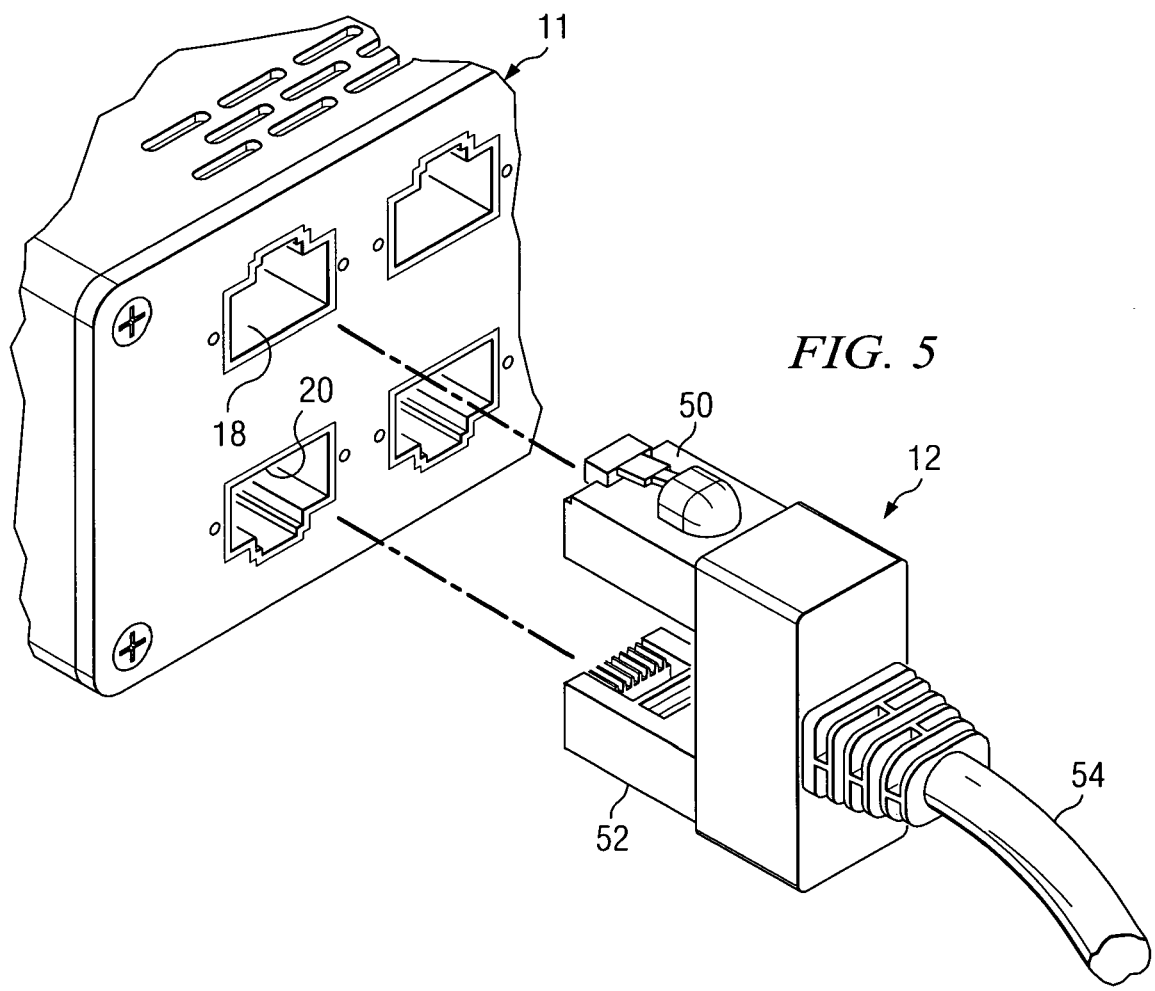

INCREASED POWER FOR POWER OVER ETHERNET APPLICATIONS

TECHNICAL FIELD OF THE INVENTION

This invention relates generally to power over Ethernet applications and more particularly to a method and system for providing increased power for power over Ethernet applications.

BACKGROUND OF THE INVENTION

Numerous powered devices utilize power delivered over four-pair Ethernet cables. IEEE has issued a standard, IEEE 802.3af, that specifies methods of power delivery over Ethernet. In particular, the standard describes the use of two of the four pairs to deliver power to a powered device. However, as telecommunication devices adapt to meet new communication demands, such devices may have different power needs, which may include the need for additional power.

One approach described in co-pending application entitled "Improved Power Delivery Over Ethernet Cables," filed May 13, 2004, and having a Ser. No. 10/845,021, addresses the need for increased power by providing power over all four pairs. However, in some instances it may be desirable to provide increased power using conventional power supplies.

SUMMARY OF THE INVENTION

According to one embodiment of the invention, a method for supplying power over Ethernet cables includes determining whether a first port of power sourcing equipment is supplying current to a power over Ethernet powered device in a predetermined current range. The method also includes electrically connecting a second port of the power sourcing equipment to the power over Ethernet device in response to determining that a first port of the power sourcing equipment is supplying current to the power over Ethernet powered device. The method also includes supplying power from the second port to the power over Ethernet powered device.

According to another embodiment of the invention, an apparatus includes a current detection circuit operable to determine whether a first port of power sourcing equipment is supplying current to a power over Ethernet device and a switching circuit operable to receive an indication from the current detection circuit that the first port of the power sourcing equipment is supplying current to a power over Ethernet device and, in response, electrically connect a second port of the power sourcing equipment to the power over Ethernet device. The apparatus also includes a detection circuit operable to mimic a valid power over Ethernet device.

Important technical advantages of certain embodiments of the present invention include the provision of increased power to a single powered device through a plurality of ports from power sourcing equipment. This allows, in some embodiments, for the powering of a high powered power over Ethernet device by standard power sourcing equipment that was not intended to necessarily provide such high levels of power to the powered device. This avoids retrofitting certain systems with specifically-designed power sourcing equipment for such high powered devices. Other technical advantages of the present invention will be readily apparent to ones skilled in the art form the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, references now made to the following description, taken in conjunction with the accompanying drawings, in which:

FIG. 4 is a block diagram illustrating a system for providing power to Ethernet devices according to yet another embodiment of the invention; and FIG. 5 is a schematic diagram illustrating one mechanical embodiment for the adapter of FIGS. 1 and 2B according to the teachings of the invention.

DETAILED DESCRIPTION OF EXAMPLE EMBODIMENTS OF THE INVENTION

Figure 1:
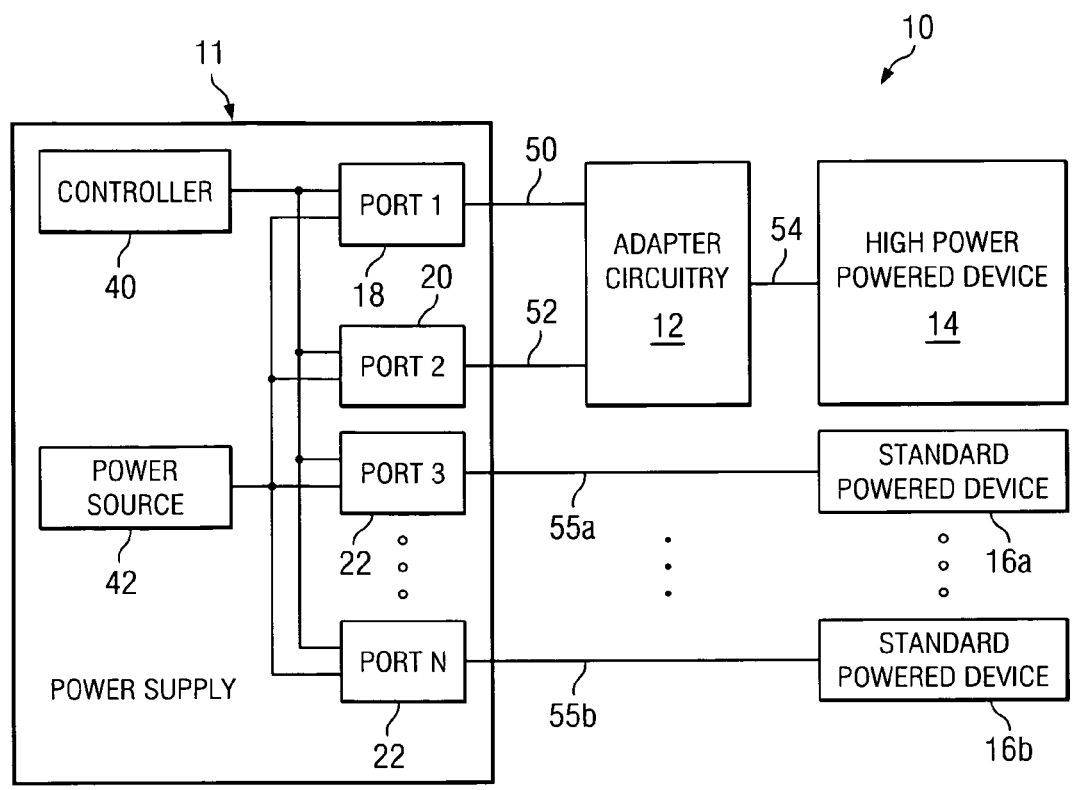
FIG. 1 is a block diagram of a power over Ethernet system according to the teachings of the invention.

FIG. 1 illustrates a power delivery system 10 involving the delivery of power to one or more powered devices over Ethernet cables. System 10 includes power sourcing equipment 11 for providing power, an adapter circuit 12 for taking power from more than one port of power sourcing equipment 11 and providing it to a single high power powered device 14, the high power powered device 14, and standard power powered devices 16. High power powered device 14 receives power from multiple ports of power sourcing equipment 11, and often, requires more power than is capable of being supplied by a given port of power sourcing equipment 11 and that may consume power levels outside of current IEEE levels.

According to the teachings of the invention, adapter circuitry 12 receives power from more than one port of power sourcing equipment 11 and provides this power to a single powered device, allowing a high power powered device to be powered by conventional power supplies having ports with maximum power outputs that individually cannot meet the power requirements of the high power powered device. As described in co-pending application entitled "Improved Power Delivery Over Ethernet Cables," filed May 13, 2004, and having a Ser. No. 10/845,021, which is incorporated herein by reference, one method for delivering increased power to power over Ethernet powered devices is to provide power over all data pairs within an Ethernet cable. Traditionally, only half of the pairs are used to transmit power with the other half being used sometimes for data and sometimes not being used at all. According to the teachings of the present invention, it is recognized that certain powered devices requiring increased power may be used in conjunction with power over Ethernet power supplies that are not designed to provide power in such a manner. Thus, an adapter is provided that takes power from multiple ports of a power supply to produce increased power for that powered device.

Power sourcing equipment 11 includes multiple ports 18, 20, and 22. A controller 40 controls power source 42 and the selective access by ports 18, 20, and 22 to such power. Ports 18 and 20 provide power to adapter circuitry 12 over lines 50 and 52, respectively. Ports 22 provide power to standard powered devices 16 over lines 55.

Adapter circuitry 12 receives power over lines 50 and 52 from ports 18 and 20, respectively. Adapter circuitry 12 outputs power over line 54 to high power powered device 14. Additional details associated with adapter circuitry are described in greater detail below in conjunction with FIGS. 2A-2D.

In one embodiment, high power powered device 14 requires more than 12.95 watts, which is the current maximum level typically consumed by power over Ethernet powered devices. Standard power devices 16 are standard power over Ethernet devices. Powered devices 14 and 16 may include a telephone, a personal computer, a personal digital assistant, a laptop, a wireless network access point, a docking station, or other device that may be powered over Ethernet lines.

Figure 2A:
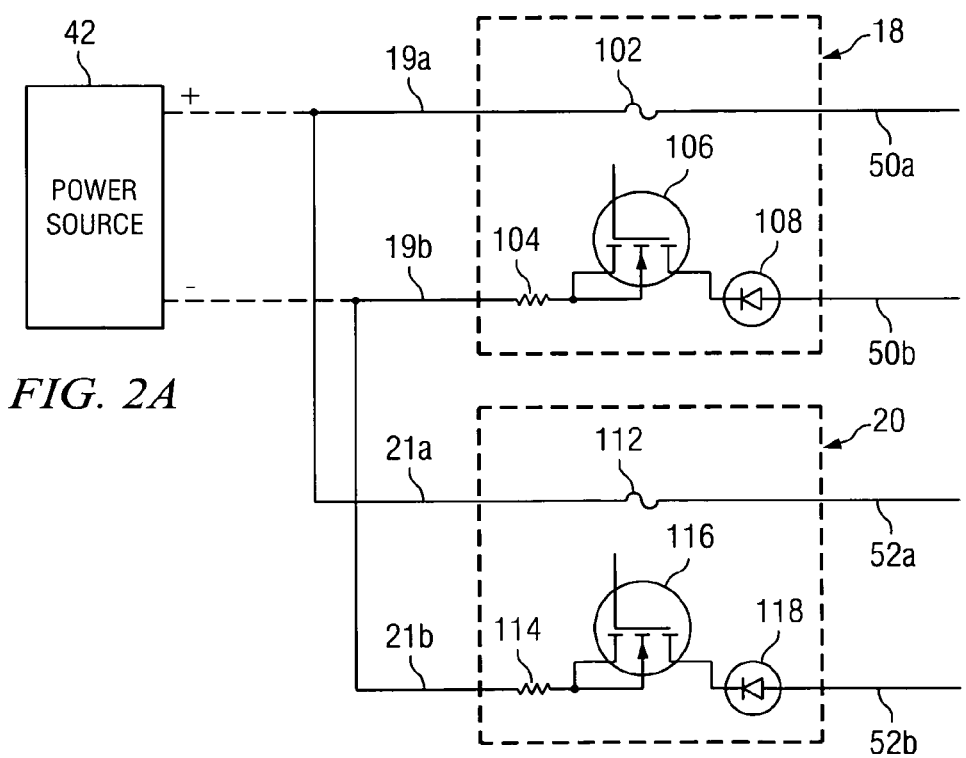
FIG. 2A is a circuit diagram of portions of the power supply of FIG. 1.

FIG. 2A is a common mode circuit diagram showing additional detail of portions of port 18 and port 20 of power sourcing equipment 11. As used herein, "common mode circuit diagram" refers to a simplified circuit diagram with wires combined to a single wire that are at the same potential. It will be understood that this combination of wires is suitable for frequencies within the pass band of the power sourcing equipment. As illustrated, port 18 includes a fuse 102 connecting an input line 19A of port 18 to an output line 50A of port 18. Input line 19A is selectively coupled to power source 42 through a switch 106. An input node 19B is coupled to the negative terminal of power source 42 through a switch 116. Port 18 also includes a resistor 104 in series with switch 106 and a diode 108 in this embodiment. Switch 106, which in this example is a MOSFET, is controlled by controller 40 to appropriately switch on and off at appropriate times to provide power over line 50. Valid IEEE methods outlined in 802.3 af are supplied, including the use of resistor 104 for DC disconnect detection and the use of diode 108 for AC disconnect detection. In general, diode 108 detects the absence of a powered device by detecting a high level of impedance, indicating the powered device has been removed.

Port 20 is analogous to port 18 having input nodes 21A and 21B with output nodes 52A and 52B. Port 20 also includes a fuse 112, switch 116, a resistor 114, and a diode 118. Although according to one embodiment of the invention an adapter 112 is utilized to supply power from multiple ports to a single powered device, it will be understood that ports 18 and 20 could represent a single port of a power supply that supplies power over all of its data pairs.

Figure 2B:
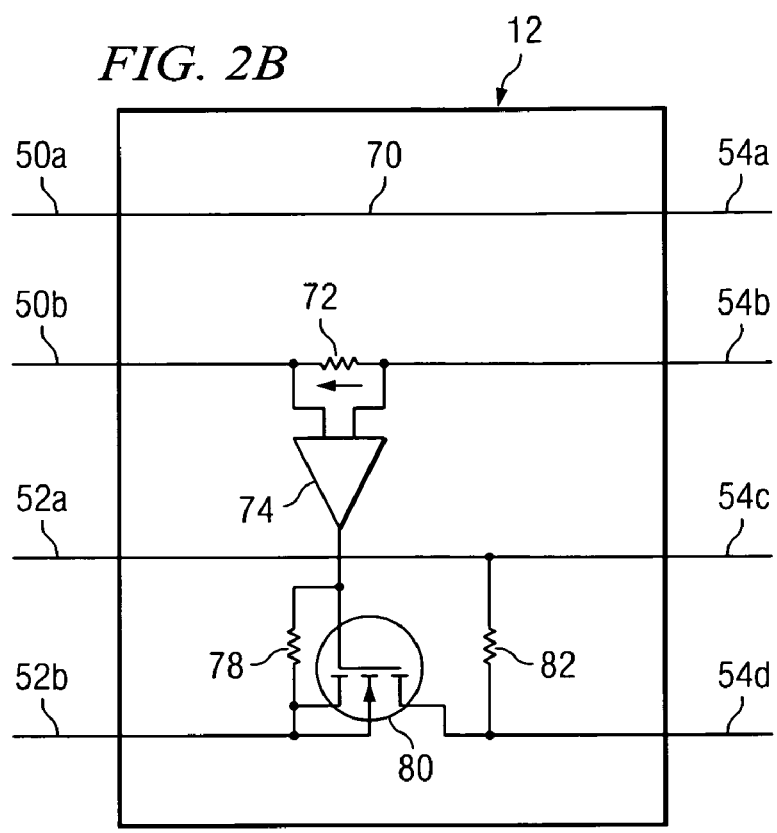
FIG. 2B is a circuit diagram of portions of the adapter of FIG. 1.

FIG. 2B is a common mode circuit diagram illustrating additional details of adapter 12. It will be understood that any suitable connections (not explicitly shown) may be used to couple lines 50*a*, 50*b*, 52*a*, 52*b*, 54*a*, 54*b*, 54*c*, and 54*d* to adapter circuitry 12. Adapter 12 receives lines 50 and 52 from ports 18 and 20, respectively. A first line 50A of lines 50 is connected to line 54A. A second line 50B of lines 50 is connected to a resistor 72 having an amplifier 74 measuring the voltage drop across resistor 72 to provide a current measurement. As described in greater detail below, this current measurement may be used to indicate whether power is being supplied by port 18, allowing port 20 to react appropriately. Resistor 72 is coupled to line 54B. It will be understood that other techniques may be used to detect current, including without limitation, a Hall-effect sensor, which detects the magnetic field due to current passing through the wire used to power the powered device, and an AC-disconnect circuit. Further, the voltage across the wire pair may be used to determine when to perform a current measurement; if it is within the expected power-on voltage range, power-on is assumed.

A first line 52A of lines 52 is connected to line 54C. Line 52B is connected to a switch 80. Switch 80 receives output from amplifier 74, which is an indicator of the level of current flow through resistor 72. If the current flow through resistor 72 is at an appropriate level that is indicative of port 18 providing power to high power powered device 14, this indicates that power may be desired from port 20. If such is the case, switch 80 closes, completing the circuit between lines 52A and 52B, allowing current to flow. A resistor 78 is provided in parallel with MOSFET transistor 80. It will be understood that other alternatives to a MOSFET for providing this circuit switching capability may be utilized. As described in greater detail below, a resistor 82 connecting lines 54*c* and 54*d* is provided to allow power over Ethernet detection and is selected to have a resistance value approximately equal to the resistance of high power powered device 14. Alternatively, resistor 82 may be replaced with a subcircuit that permits detection and classification. This subcircuit may take the form of that which is normally used in a powered device. One advantage to using such a subcircuit is that any arbitrary power requirement can be accounted for.

Figure 2C:
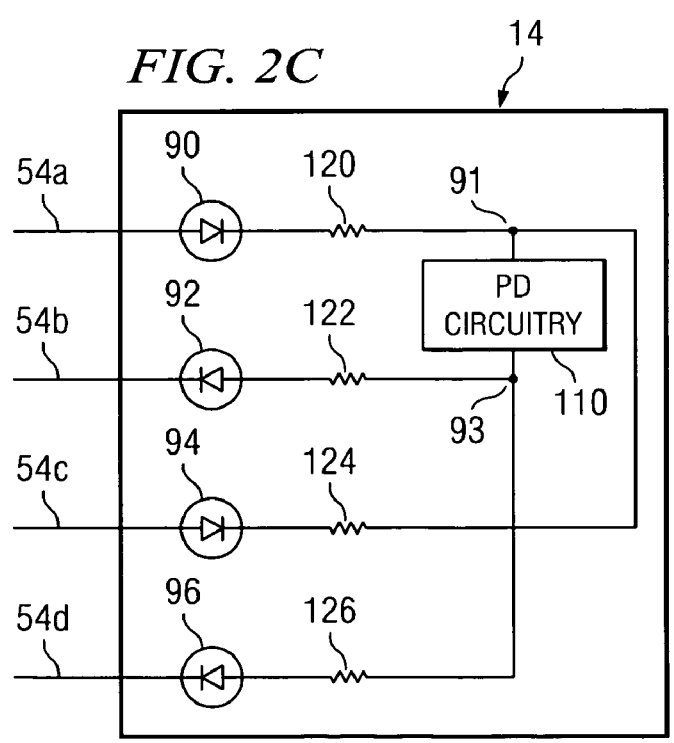
FIG. 2C is a circuit diagram of portions of the high power powered device of FIG. 1.

FIG. 2C is a common mode circuit diagram of portions of high power powered device 14. As illustrated, high power powered device 14 receives a plurality of lines 54A, 54B, 54C, and 54D of line 54. Line 54A is coupled to a diode 90 in series with a resistor 120. The functions of diode 90 and resistor 120 are described in greater detail below in conjunction with FIG. 2D. The operating circuitry 110 of the powered device receives power from nodes 91 and 93. This power may originate from power source 42 within power sourcing equipment 11, or from external sources, such as a battery or isolated power supply. A resistor 122 and diode 92 are similarly provided in series coupling back to the negative terminal at 54B. Lines 54C and 54D are similarly coupled to powered device circuitry 110 at nodes 91 and 93, through diode 94 and resistor 124 and diode 96 and resistor 126, respectively. Thus, as illustrated, power from both ports 18 and 20 are provided over lines 54A-54D to powered device circuitry 110 between nodes 91 and 93. It will be understood that diodes 90, 92, 94, and 96 may be replaced with full-wave rectifiers, where appropriate.

Figure 2D:
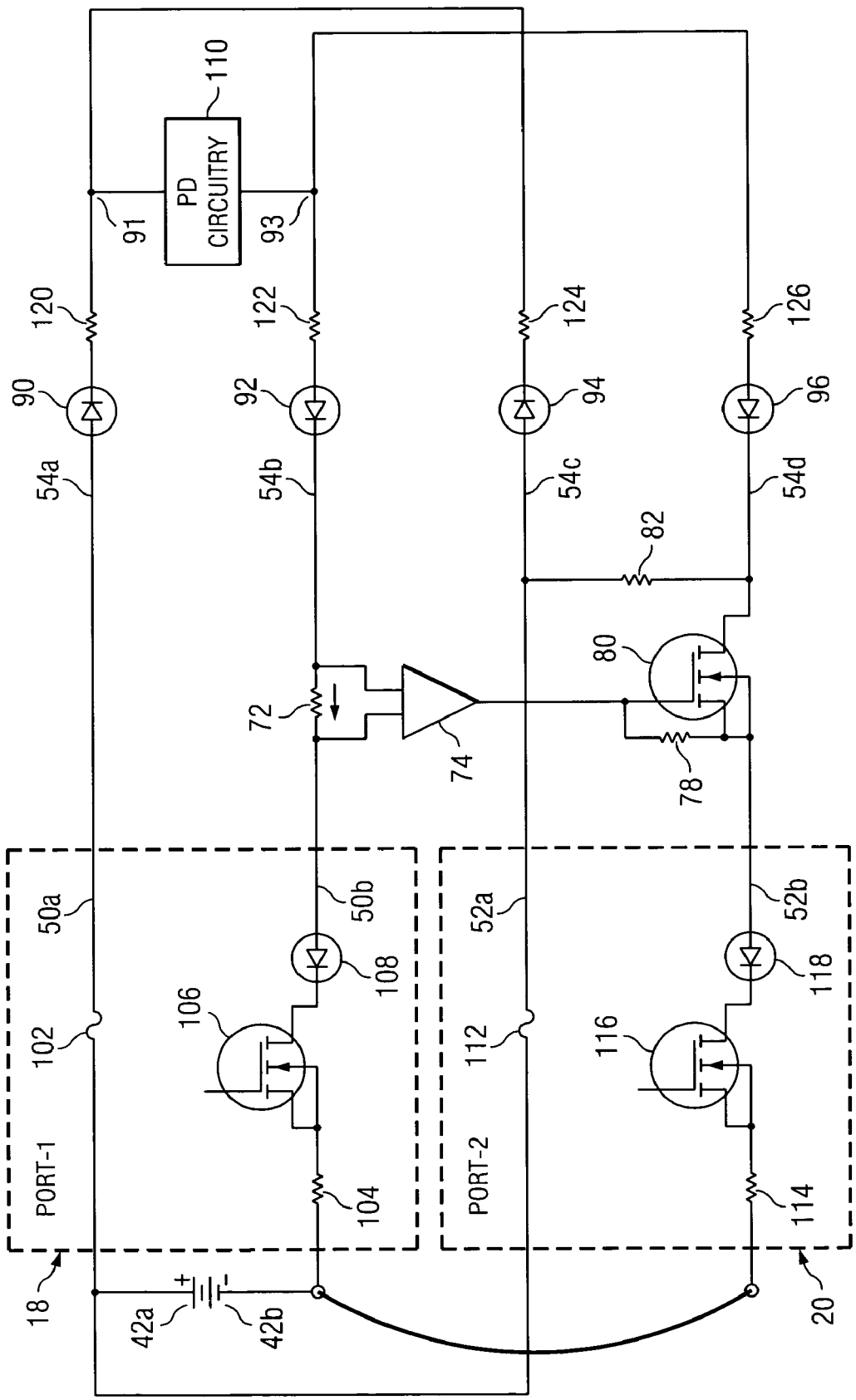
FIG. 2D is a circuit diagram showing portions of the power supply, adapter circuitry, and high power powered device of FIG. 1, all on the same figure.

FIG. 2D is a common mode circuit diagram showing portions of power sourcing equipment 11, adapter 12, and high power powered device 14 illustrated in FIGS. 2A, 2B, and 2C. In this view the circuit elements are illustrated with their connections to each other in a single figure. Operation of power delivery system 10 is described with reference to FIG. 2D.

Power from power source 42 may be supplied to port 18 and provided over nodes 50A and 50B to adapter 12. Standard IEEE power over Ethernet procedures may occur, including detection, powered device classification, powering up, and monitoring. In general, according to IEEE specifications, during detection, a voltage is supplied over nodes 50A and 50B that is less than approximately ten volts and the resulting current is measured to obtain an overall resistance value. The overall resistance value indicates whether powered device circuitry 110 is present. Only after a valid power device is detected with a valid resistance does the process continue to classification.

In general, according to IEEE specifications, at classification a particular voltage between 20 and 30 volts is supplied over nodes 50A and 50B. If the powered device is a valid powered device the current that is drawn will be independent of the voltage supplied in that range of 20 to 30 volts. Thus, if a valid current range is seen when these various voltage levels are provided, the powered device may be classified. After classification, 48 volts, which is the nominal voltage supplied by power sourcing equipment 11, is supplied over nodes 50A and 50B by turning on switch 106. Monitoring then occurs to determine whether the powered device is removed.

The above IEEE procedure is a standard procedure for providing power over to a power over Ethernet powered device. Port 18 operates according to this standard procedure. However, port 20, may not power up in this manner because switch 118 is open during this detection sequence. However once port 18 is powered such that it is operating at 48 volts (or other suitable power supply voltage), sufficient current flows through resistor 72 to turn on switch 80. Current flow through resistor 72 is monitored by amplifier 74, providing an indication of the powered-up status of powered device circuitry 110. Once switch 80 is turned on, port 20 proceeds to a standard detection phase; however, because of the 48 volts supplied to power device circuitry 110, diodes 94 and 96 are reverse biased. Therefore port 20 sees resistor 82 but not the resistance of powered device circuitry 110. Thus, resistor 82 is provided with a resistance level sufficient to result in a valid detection, even though port 20 does not actually see powered device circuitry 110, and therefore resistor 82 acts to mimic the appearance of a valid power over Ethernet device, even though it does not actually detect a power over Ethernet device. As described above, other detection techniques may be used. Then normal IEEE classification may occur. According to one example, classification for port 20 will default to providing maximum power. Resistors 120, 122, 124, and 126 help to balance the power level supplied by each port 18 and 20.

Thus, adapter 12 provides a mechanism for sensing whether port 18 is providing current to powered device circuitry 110, and if so, effects a turning on of switch 8b associated with port 20. To allow detection by port 20, resistor 82 mimics the resistance of powered device circuitry 110.

Figure 3:
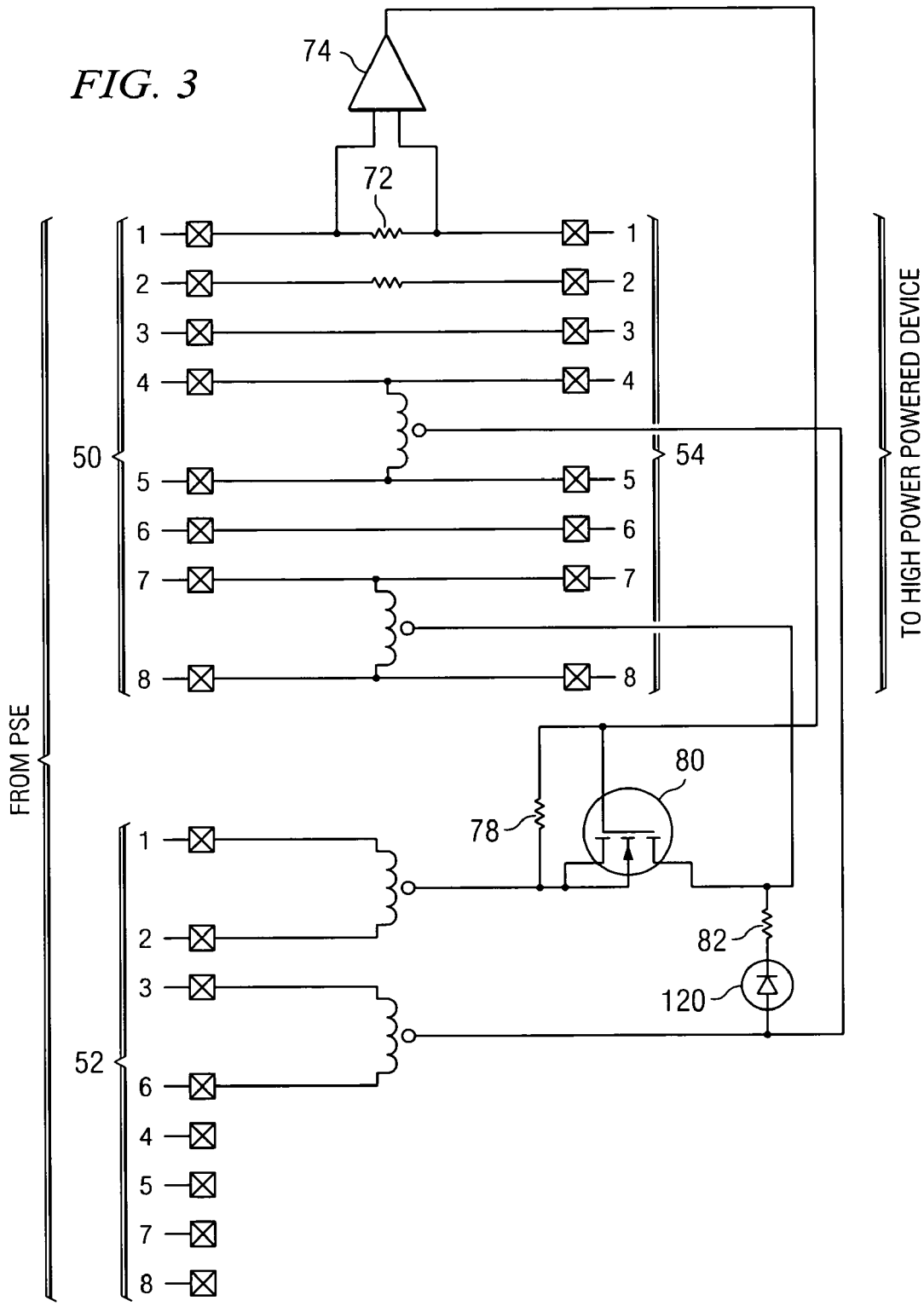
FIG. 3 is a pin diagram illustrating connections of the adapter of FIGS. 1 and 2B.

FIG. 3 is a circuit diagram illustrating additional details of the adapter 12. In particular, pin assignments and connections are illustrated. All signals from port 18 over line 50 are passed to powered device 14 over line 54. Power is passed to pairs C and D (pins 4, 5, 7, and 8) using a transformer that blocks data transfer and permits IEEE 802.3AF detection, classification, and power transfer. This power is tapped from the port 20 interface using a transformer coupling. All pairs of port 20 are properly terminated. A diode 120 is provided in series with resistor 82 in this embodiment. This diode 120 prevents the detection from being valid with an incorrect polarity power supply. The minimal power requirements for the circuits are tapped from the power interface and do not contribute significantly to the budget of power sourcing equipment 11.

FIG. 4 is a block diagram illustrating a power delivery system 210 according to yet another embodiment of the invention. As described above, an adapter for supplying power received from two ports of a power supply to a single input of a high power device was described. This may be generalized to providing power from N ports to a high power device, as illustrated. In this example, ports 218, 220, and 222 provide power over lines 250, 252, and 255 to adapter circuitry 212, which provides power to high power device 214 over line 254. The approach described in FIGS. 2A-2D may be utilized for N ports by including a current detecting device, such as resistor 72 and amplifier 74 in the adapter portion associated with all ports except the last port and by providing a switch, such as switch 80 in the adapter portion associated with all ports except the first port. In this manner each successive port may be selectively turned on as power is required from high power device 214, as described above.

It should be noted that the second and any subsequent ports may be turned on based on the class provided by the high power powered device. An example technique for accomplishing this includes permitting power detection and classification on a second port in response to seeing a power demand on the first port. Another example involves the use of an intelligent subcircuit that may snoop the transactions between power sourcing equipment and the powered device on the first port. The class, which may include a class not presently existing, can be discovered by determining what class is being passed between the devices. For example, knowing the port voltage indicates if a class is being performed. Then monitoring the current indicates the class. Another example includes snooping a side band protocol to discover the systems class. One technique for such snooping is described in co-pending application entitled "In-Line Power-Based Common Mode Communications in a Wired Data Telecommunications Network," filed Oct. 7, 2004 and listing Roger Karam, Frederick Schindler, and Wael Diab as inventors, which is incorporated herein by reference.

FIG. 5 is a schematic diagram illustrating a physical configuration for adapter 12. As illustrated, ports 18 and 20 of power sourcing equipment 11 are shown to be adjacent ports of a power supply in which power may be delivered. Adapter 12 is constructed such that power supplied over output 54 of adapter 12 can result only from the provision of power to adapter 12 from a single power sourcing equipment 11. Thus, in this example, the input ports 50 and 52 at adapter 12 are configured to mate with output ports 18 and 20 of a single power supply. This prevents power from being supplied by an adapter that comes from two different power sources. Supplying power from two different power sources, as opposed to two ports of a given power source, causes reliability and safety concerns. It will be understood that FIG. 5 illustrates one of many possible physical configurations that may be utilized, including those utilizing two horizontal connections as well as combining together more than two ports.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A method for supplying power over Ethernet comprising:
   determining that a first port of power sourcing equipment is supplying current to a power over Ethernet device in a predetermined current range;
   in response to determining that a first port of the power sourcing equipment is supplying current to the power over Ethernet device in a predetermined current range, electrically connecting a second port of the power sourcing equipment to the power over Ethernet powered device; and supplying power from the second port to the power over Ethernet device.

2. The method of claim 1, and further comprising detecting the power over Ethernet device in response to determining that the first port of the power sourcing equipment is supplying current to the power over Ethernet device in a predetermined range.

3. The method of claim 2, and further comprising detecting the power over Ethernet device by determining whether a resistance level seen by the second port is within a predetermined resistance range.

4. The method of claim 3, and further comprising classifying the power over Ethernet device in response to determining whether a resistance level seen by the second port is within a predetermined range.

5. The method of claim 1, wherein determining that a first port of a power supply is supplying current to a power over Ethernet powered device comprises measuring a voltage drop through a resistor disposed between the first port and the power over Ethernet powered device.

6. The method of claim 1, wherein electrically connecting a second port of the power device to the power over Ethernet powered device comprises switching a switch disposed between the second port and the power over Ethernet device.

7. The method of claim 6, wherein the switch is a MOSFET.

8. The method of claim 3, wherein determining that a resistance level seen by the second port is within a predetermined resistance range comprises reverse biasing at least one diode disposed between the second port and the power over Ethernet device, thereby isolating the power over Ethernet device from the second port, and exposing the second port to a resistance level within the predetermined resistance range.

9. The method of claim 8, wherein exposing the second port to a resistance level comprises exposing the second port to a resistor having a value approximately equal to a resistance of the power over Ethernet powered device.

10. The method of claim 1, wherein the power over Ethernet device is selected from the group consisting of an IP phone, a computer, a wireless network access point, and a docking station.

11. The method of claim 1, wherein the power over Ethernet powered device requires more than 12.95 watts.

12. An apparatus comprising:
a current detection circuit operable to determine whether a first port of power sourcing equipment is supplying current to a power over Ethernet powered device;
a switching circuit operable to receive an indication from the current detection circuit that the first port of the power sourcing equipment is supplying current to a power over Ethernet powered device, and, in response, electrically connect a second port of the power sourcing equipment to the power over Ethernet powered device; and
a detection circuit operable to mimic a valid power over Ethernet device.

13. The apparatus of claim 12, wherein the detection circuit comprises a resistance element operable to mimic a resistance of the power over Ethernet device that is seen by the second port.

14. The apparatus of claim 12, wherein the current detection system comprises a resistor and an amplifier operable to measure a voltage drop across the resistor.

15. The apparatus of claim 12, wherein the switching circuit comprises a MOSFET.

16. The apparatus of claim 13, wherein the resistance element comprises a resistor.

17. The apparatus of claim 16, wherein the detection circuit comprises at least one reverse-biased diode connected to the resistor such that current is prevented from flowing to the power over Ethernet powered device from the second port but allowed to flow through the resistor from the second port, thereby allowing detection of a valid power over Ethernet powered device by mimicking the resistance of the power over Ethernet powered device.

18. The apparatus of claim 12, wherein the power over Ethernet powered device is selected from the group consisting of an IP phone, a computer, a wireless network access point, and a docking system.

19. The apparatus of claim 12, and further comprising the power over Ethernet powered device and wherein the power over Ethernet powered device is operable to receive power from the first and second ports of the power sourcing equipment.

20. The apparatus of claim 12, wherein the current detection circuit and switching circuit are disposed within a housing having two ports mechanically configured to couple to two adjacent ports of the power sourcing equipment, thereby hindering the provision of power from two independent power supplies.

21. The apparatus of claim 20, wherein the detection circuit is disposed within the housing.

22. An apparatus comprising:
a current detection means for determining whether a first portion of power sourcing equipment is supplying current to a power over Ethernet powered device;
a switching means for receiving an indication from the current detection means that the first port of the power sourcing equipment is supplying current to the power over Ethernet powered device and, in response, electrically connect a second port of the power sourcing equipment to the power over Ethernet powered device; and
a detection means for mimicking a valid power over Ethernet device.

23. The apparatus of claim 22, and further comprising the power over Ethernet powered device, and wherein the power over Ethernet powered device is operable to receive power from the first and second ports of the power sourcing equipment.

24. The apparatus of claim 22, and further comprising a housing means for housing the current detection means and the switching means and for hindering the provision of power from two independent power supplies.

25. The apparatus of claim 24, when the detection means is disposed within the housing means.

26. A power over Ethernet system comprising:
power sourcing equipment having first and second ports operable to provide power;
an adapter for facilitating the delivery of power from the power sourcing equipment comprising:
a current detection circuit operable to determine whether a first port of the power sourcing equipment is supplying current to a power over Ethernet powered device;
a switching circuit operable to receive an indication from the current detection circuit that the first port of the power sourcing equipment is supplying current to a power over Ethernet powered device and, in response, electrically connect the second port of the power sourcing equipment to the power over Ethernet device; and a detection circuit operable to mimic a valid power over Ethernet powered device; and the power over Ethernet powered device coupled to the adapter.

27. The power over Ethernet system of claim 26, wherein the power sourcing equipment is operable to classify the power over Ethernet device and selectively supply power over one or both of the first and second ports based on the classification.

28. The power over Ethernet system of claim 26, wherein the power over Ethernet powered device includes at least one diode operable to isolate the second port from the power over Ethernet powered device when the at least one diode is reversed-biased.

29. The power over Ethernet system of claim 28, wherein the power over Ethernet powered device includes at least one input resistor in series with the at least one diode for regulating the amount of current flowing through the diode.

30. The power over Ethernet system of claim 26, wherein the first and second ports each include a diode for providing an AC disconnect.

31. A power over Ethernet system comprising:

a power sourcing equipment means for supplying power;

adapter means for facilitating the delivery of power from the power sourcing equipment means, the adapter means including:

a current detection means for determining that a first part of the power sourcing equipment is supplying current to a power over Ethernet powered device;

a circuit switching means for receiving an indication from the current detection means that the first port of the power sourcing equipment is supplying current to a power over Ethernet powered device and, in response, electrically connect a second port of the power sourcing equipment to the power over Ethernet device; and a detection means for mimicking a valid power over Ethernet device; and the power over Ethernet powered device for receiving power from the adapter means.

* * * * *